(12) United States Patent  
Yu

(10) Patent No.: US 12,462,509 B2
(45) Date of Patent: Nov. 4, 2025

(54) DATA SYNCHRONIZATION METHOD AND ELECTRONIC DEVICE

(71) Applicant: BOE TECHNOLOGY GROUP CO., LTD., Beijing (CN)

(72) Inventor: Hongda Yu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/272,551

(22) PCT Filed: Oct. 28, 2021

(86) PCT No.: PCT/CN2021/126974
§ 371 (c)(1),
(2) Date: Jul. 14, 2023

(87) PCT Pub. No.: WO2023/070423
PCT Pub. Date: May 4, 2023

(65) Prior Publication Data
US 2024/0087268 A1    Mar. 14, 2024

(51) Int. Cl.
*G06T 19/20*   (2011.01)
(52) U.S. Cl.
CPC ...... *G06T 19/20* (2013.01); *G06T 2219/2004* (2013.01)
(58) Field of Classification Search
CPC ... G06T 19/20; G06T 2219/2004; G06T 7/70; G06T 2219/2016; G06F 16/29; G06F 16/27; G06F 3/011; H04W 4/02; G06V 10/141; G06V 20/20; A63F 13/52; A63F 13/837; A63F 13/573; A63F 2300/8076
See application file for complete search history.

(56) References Cited

U.S. PATENT DOCUMENTS

| | | | |
|---|---|---|---|
| 7,209,758 | B1 | 4/2007 | Moll et al. |
| 8,441,486 | B2 | 5/2013 | Gower |

(Continued)

FOREIGN PATENT DOCUMENTS

| | | |
|---|---|---|
| CN | 104819722 A | 8/2015 |
| CN | 106649821 A | 5/2017 |

(Continued)

OTHER PUBLICATIONS

He, Jiahong, Research on the Target Locating and Tracking Based on Wireless Sensor Network Spatial Meshing, Master's Dissertation, May 18, 2013, Hunan University, Changsha, Hunan, China.

*Primary Examiner* — Chong Wu
(74) *Attorney, Agent, or Firm* — HOUTTEMAN LAW LLC

(57) ABSTRACT

The present disclosure provides a data synchronization method including: acquiring positioning information of a target object in a target space scene; mapping the positioning information to obtain number data corresponding to the positioning information, wherein a data amount of the number data is less than that of the positioning information; and sending the number data to a server so that the server sends the number data to other client. The technical scheme according to the embodiment of the present disclosure can effectively decrease the data amount in the data synchronization process and the bandwidth pressure.

18 Claims, 12 Drawing Sheets

(56) References Cited

U.S. PATENT DOCUMENTS

2022/0164597 A1* 5/2022 Ye .......................... G06V 20/58
2023/0111489 A1* 4/2023 Zohar .................. G06V 40/103
345/633

FOREIGN PATENT DOCUMENTS

| CN | 110505465 A | 11/2019 |
| CN | 110532342 A | 12/2019 |
| CN | 111641924 A | 9/2020 |
| CN | 111898819 A | 11/2020 |
| CN | 112396441 A | 2/2021 |
| CN | 113157843 A | 7/2021 |

* cited by examiner

DATA SYNCHRONIZATION METHOD AND ELECTRONIC DEVICE

TECHNICAL FIELD

The present disclosure relates to the field of digital twinning technologies, and in particular, to a data synchronization method and an electronic device.

BACKGROUND

With the rapid development of technologies such as the Internet of things and big data, the intelligent park based on the digital twinning technology becomes the current development trend of the intelligent park. In a space scene, positioning information of a large amount of smart devices need to be synchronized in real time, and the total data amount of the positioning information is large in the presence of a large number of the smart devices, thereby resulting in a large bandwidth pressure.

SUMMARY

As a first aspect, an embodiment of the present disclosure provides a data synchronization method for a client, including: acquiring positioning information of a target object in a target space scene; mapping the positioning information to obtain number data corresponding to the positioning information, wherein a data amount of the number data is less than a data amount of the positioning information; and sending the number data to a server, so that the server sends the number data to other client.

In some embodiments, the positioning information includes position information and/or orientation information, and the number data includes an area position number corresponding to the position information and/or an orientation area number corresponding to the orientation information, a data amount of the area position number being less than a data amount of the position information, and a data amount of the orientation area number being less than a data amount of the orientation information.

In some embodiments, the target space scene is an n-dimensional space, n is an integer greater than or equal to 2, the position information is n-dimensional data, and the area position number is 1-dimensional data, and the orientation information is n-dimensional data, and the orientation area number is 1-dimensional data.

In some embodiments, mapping the positioning information to obtain the number data includes: determining the number data corresponding to the positioning information, according to the mapping data configured for the target space scene acquired in advance, wherein a mapping relation between different positioning information and the number data is recorded in the mapping data.

In some embodiments, the positioning information includes the position information, and the target space scene comprises a plurality of subspaces; the mapping data includes a position mapping table in which a plurality of pieces of data in one-to-one correspondence with the plurality of subspaces are recorded, and each piece of data in the position mapping table includes an area position number of a subspace and first area description data used for defining a range of an area defined by the subspace.

In some embodiments, the plurality of subspaces of the target space scene are the same in shape and equal in size; or the plurality of subspaces of the target space scene are not completely the same in shape and/or are not completely equal in size.

In some embodiments, the target space scene is a 3-dimensional space, each of the plurality of subspaces is a cubic subspace, and the first area description data includes coordinates of a center point of a subspace and coordinates of one vertex of the subspace.

In some embodiments, determining the number data corresponding to the positioning information according to the mapping data configured for the target space scene acquired in advance, includes: determining the subspace where the target object is located according to the first area description data in the pre-selected position mapping table and the position information to obtain the area position number of the subspace where the target object is located.

In some embodiments, determining the subspace where the target object is located according to the first area description data in the pre-selected position mapping table and the position information to obtain the area position number of the subspace where the target object is located, includes: detecting whether the target object is located in the subspace corresponding to the area position number obtained last time or not, according to the area position number obtained last time, the first area description data, and the position information; taking the area position number obtained last time as the area position number of the subspace where the target object is currently located, in response to that the target object is located in the subspace corresponding to the area position number obtained last time; acquiring a candidate subspace set according to the area position number obtained last time, in response to that the target object is not located in the subspace corresponding to the area position number obtained last time, wherein the candidate subspace set comprises at least one candidate subspace; detecting whether the target object is located in one of the at least one candidate subspace of the candidate subspace set according to the first area description data and the position information; taking the area position number of the candidate subspace where the target object is located as the area position number corresponding to the position signal, in response to that the target object is located in one of the at least one candidate subspace of the candidate subspace set; updating the candidate subspace set, in response to that the target object is not located in one of the at least one candidate subspace of the candidate subspace set, and continuing to detect whether the target object is located in one of the at least one candidate subspace of the candidate subspace set according to the first area description data and the position information.

In some embodiments, the target space scene is a 3-dimensional space, the positioning information includes the orientation information which is a 3-dimensional direction vector corresponding to an orientation; the mapping data includes an orientation mapping table, the orientation mapping table is generated based on a preset virtual reference sphere, and a spherical surface of the virtual reference sphere comprises a plurality of curved surface areas; and a plurality of pieces of data in one-to-one correspondence with the plurality of curved surface areas are recorded in the orientation mapping table, and each piece of data in the orientation mapping table includes an area orientation number of a curved surface area and second area description data for defining a range of an area defined by the curved surface area.

In some embodiments, the plurality of curved surface areas of the spherical surface of the virtual reference sphere are the same in shape and equal in size; or the plurality of curved surface areas of the spherical surface of the virtual reference sphere are not completely the same in shape and/or are not completely equal in size.

In some embodiments, each of the plurality of curved surface area is a curved surface having three sides or a curved surface having four sides, and the second area description data includes coordinates of a center point of the curved surface area, coordinates of one vertex of the curved surface area, and a direction vector from a spherical center of the virtual reference sphere to the center point of the curved surface area.

In some embodiments, determining the number data corresponding to the positioning information according to the mapping data configured for the target space scene acquired in advance, includes: determining a curved surface area towards which the target object is oriented when the target object is positioned at the spherical center of the virtual reference sphere according to the second area description data in the pre-selected direction mapping table and the orientation information to obtain the area direction number of the curved surface area towards which the target object is oriented. In some embodiments, determining the curved surface area towards which the target object is oriented when the target object is at the center of the virtual reference sphere, according to the second area description data in the pre-selected orientation mapping table and the orientation information to obtain the area orientation number of the curved surface area towards which the target object is oriented, includes: acquiring, according to the orientation information, coordinates of an intersection point where the orientation of the target object intersects the spherical surface of the virtual reference sphere when the target object is positioned at the sphere center of the virtual reference sphere; detecting whether the coordinates of the intersection point are located in the curved surface area corresponding to the area orientation number obtained last time, according to the area orientation number obtained last time, the second area description data, and the coordinates of the intersection point; taking the area orientation number obtained last time as the area orientation number of the curved surface area to which the target object is currently oriented, in response to that the coordinates of the intersection point are located in the curved surface area corresponding to the area orientation number obtained last time; acquiring a candidate curved surface area set according to the area orientation number obtained last time, in response to that the coordinates of the intersection point are not located in a curved surface area corresponding to the area orientation number obtained last time, wherein the candidate curved surface area set includes at least one candidate curved surface area; detecting whether the coordinates of the intersection point are located in one of the at least one candidate curved surface area of the candidate curved surface area set, according to the second area description data and the coordinates of the intersection point; taking the area orientation number of the candidate curved surface area where the coordinates of the intersection point are located as the area orientation number of the curved surface area to which the target object is oriented, in response to that the coordinates of the intersection point are located in one of the at least one candidate curved surface area of the candidate curved surface area set; updating the candidate curved surface area set, in response to that the coordinates of the intersection point are not located in one of the at least one candidate curved surface area of the candidate curved surface area set; and continuing to detect whether the coordinates of the intersection point are located in one of the at least one candidate curved surface area of the candidate curved surface area set according to the second area description data and the coordinates of the intersection point.

In some embodiments, before the determining the number data corresponding to the positioning information according to the mapping data acquired in advance, the method further includes: acquiring the mapping data from the server; and storing the mapping data.

In some embodiments, storing the mapping data includes: saving the mapping data on a storage disk, and caching the mapping data in an internal storage.

In some embodiments, after storing the mapping data, the method further includes: synchronously updating the stored mapping data for the target space scene in response to the updating of the mapping data for the target space scene in the server.

In some embodiments, between mapping the positioning information to convert the positioning information into the number data and sending the number data to the server, the method further includes: detecting whether the number data obtained currently is the same as the number data obtained last time; acquiring the positioning information of the target object in the target space scene, in response to that the number data obtained currently is the same as the number data obtained last time; and sending the number data to the server, in response to that the number data obtained currently is not the same as the number data obtained last time.

In some embodiments, acquiring the positioning information of the target object in the target space scene after a preset time interval elapses in response to that the currently obtained number data is the same as the number data obtained last time; the data synchronization method further includes: determining whether the preset time interval reaches a preset maximum time interval or not in response to that the currently obtained number data is the same as the number data obtained last time for i times, wherein i is an integer greater than or equal to 1, and maintaining the preset time interval unchanged, in response to that the preset time interval reaches the preset maximum time interval; increasing the preset time interval, in response to that the preset time interval does not reach the preset maximum time interval; in response to that the number data obtained currently is the same as the number data obtained last time, the method further includes: setting the preset time interval as a preset default time interval; and acquiring the positioning information of the target object in the target space scene, after the number data is sent to the server and the preset default time interval elapses.

In some embodiments, the target space scene includes a virtual game scene or a virtual interactive scene.

As a second aspect, a data synchronization method for a client, including: receiving number data sent from a server; and mapping the number data to obtain positioning information of the target object in the target space scene, wherein a data amount of the number data is less than a data amount of the position information.

In some embodiments, the number data includes an area position number and/or an orientation area number. The positioning information includes position information corresponding to the area position number and/or orientation information corresponding to the orientation area number, a data amount of the area position number being less than a data amount of the position information, and a data amount of the orientation area number being less than a data amount of the orientation information.

In some embodiments, the target space scene is an n-dimensional space, n is an integer greater than or equal to 2; the position information is n-dimensional data, and the area position number is 1-dimensional data; and the orientation information is n-dimensional data, and the orientation area number is 1-dimensional data.

In some embodiments, mapping the number data to obtain the positioning information of the target object in the target space scene, includes: determining the positioning information corresponding to the number data, according to the mapping data configured for the target space scene acquired in advance, wherein the mapping relation between different positioning information and number data are recorded in the mapping data.

In some embodiments, the positioning information includes the position information, and the target space scene includes a plurality of subspaces. The mapping data includes a position mapping table in which a plurality pieces of data in one-to-one correspondence with the plurality of subspaces are recorded, each piece of data in the position mapping table includes an area position number of a subspace and first area description data for defining a range of an area defined by the subspace, and the first area description data at least comprises representative position information for the subspace in advance.

In some embodiments, the target space scene is a 3-dimensional space, each of the plurality of subspaces is a cubic subspace. The first area description data includes coordinates of a central point of a subspace and coordinates of one vertex of the subspace, and coordinates of the central point of the subspace serves as the representative position information for the subspace.

In some embodiments, determining the positioning information corresponding to the number data according to the mapping data configured for the target space scene acquired in advance, includes: determining the representative position information for the subspace where the target object is located according to the pre-selected position mapping table and the area position number of the target object, and taking the determined representative position information as the position information of the target object in the target space scene.

In some embodiments, the target space scene is a 3-dimensional space, the positioning information includes the orientation information, and the orientation information is a 3-dimensional direction vector corresponding to the orientation. The mapping data includes an orientation mapping table, the orientation mapping table is generated based on a preset virtual reference sphere, and the spherical surface of the virtual reference sphere comprises a plurality of curved surface areas. A plurality pieces of data in one-to-one correspondence with the plurality of curved surface areas are recorded in the orientation mapping table, each piece of data in the orientation mapping table comprises an area orientation number of a curved surface area and second area description data for defining a range of an area defined by the curved surface area, and the second area description data at least includes representative orientation information configured for the curved surface area in advance.

In some embodiments, the curved surface area is a curved surface having three sides or a curved surface having four sides; the second area description data includes coordinates of a central point of a curved surface area, coordinates of one vertex of the curved surface area, and a direction vector from a spherical center of the virtual reference sphere to the central point of the curved surface area; the direction vector from the spherical center of the virtual reference sphere to the center point of the curved surface area serves as the representative orientation information for the curved surface area.

In some embodiments, determining the positioning information corresponding to the number data according to the mapping data configured for the target space scene acquired in advance, includes: determining the representative orientation information for the curved surface area towards which the target object is oriented when the target object is positioned at the sphere center of the virtual reference sphere, according to the pre-selected orientation mapping table and the orientation area number of the target object, and taking the determined representative orientation information as the orientation information of the target object in the target space scene.

As a third aspect, an embodiment of the present disclosure provides a data synchronization method for a server, including: receiving number data sent from a first client; and sending the number data to a second client, so that the second client maps the received number data to obtain the positioning information of the target object in the target space scene.

In some embodiments, the data synchronization method further includes: receiving mapping data of the target space scene sent from a third client, wherein a mapping relation between different positioning information and number data is recorded in the mapping data; and storing the mapping data.

In some embodiments, storing the mapping data includes: saving the mapping data on a storage disk, and caching the mapping data in an internal storage.

In some embodiments, the data synchronization method further includes: synchronously updating the stored mapping data in response to updating of the mapping data in the third client.

In some embodiments, the data synchronization method further includes: sending the mapping data requested by a fourth client to be downloaded, to the fourth client, in response to a downloading request sent from the fourth client.

As a fourth aspect, an embodiment of the present disclosure provides an electronic device, including: one or more first processors; a first storage device having one or more programs stored thereon; the one or more programs, when being run by the one or more first processors, are configured to cause the processor to perform the data synchronization method in the first or second aspect.

As a fifth aspect, an embodiment of the present disclosure provides an electronic device, including: one or more second processors; a second storage device having one or more programs stored thereon; the one or more programs, when being run by the one or more first processors, are configured to cause the processor to perform the data synchronization method in the third aspect.

DETAIL DESCRIPTION OF EMBODIMENTS

Figure 1:
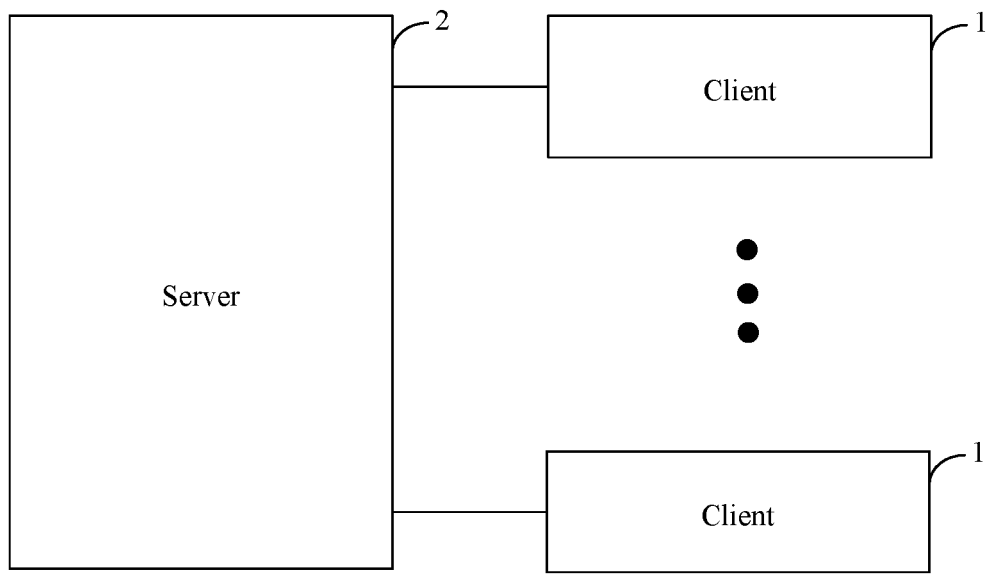
FIG. 1 is a system block diagram showing a technical solution according to an embodiment of the present disclosure.

Exemplary embodiments of the present disclosure will be described in more detail below with reference to the accompanying drawings. While exemplary embodiments of the present disclosure are shown in the drawings, it should be understood that the present disclosure may be embodied in various forms and should not be limited to the embodiments set forth herein. Rather, these embodiments are provided in order to have a more thorough understanding of the present disclosure and to fully convey the scope of the present disclosure to those skilled in the art.

A "space scene" in the embodiments of the present disclosure refers to a virtual digital scene constructed by a modeling technology (by using modeling software such as 3dsMax and AutoCAD), and can be rendered and displayed in a 3D engine. The space scene and the real physical space have a mapping relation therebetween. An "object" in the embodiments of the present disclosure is a virtual object within the space scene, to which a real smart device is mapped in a virtual digital scene.

Data synchronization for the positioning information of objects to which the real smart devices are mapped in the space scene is required to be carried out. In the related art, the positioning information required to be synchronized includes position information and orientation information of an object, wherein the position information is represented by a three-dimensional coordinate (referred to as position coordinates), and the orientation information is also represented by a three-dimensional vector (referred to as direction vectors), each of the position coordinates and the position coordinates is 32-bit floating-point type data (i.e., float 32 data). That is to say, six float 32 data are required to be synchronized for synchronizing one piece of position information. In the presence of a large number of devices, the total data amount of the position information to be synchronized is relative large, which results in a large pressure of bandwidth.

In order to effectively solve the technical problem existing in the related art, the embodiments of the present disclosure provide corresponding solutions. The technical scheme according to the embodiments of the present disclosure can effectively decrease the data amount in the data synchronization process and reduce the pressure of bandwidth.

FIG. 1 is a system block diagram showing the technical solution according to an embodiment of the present disclosure. As shown in FIG. 1, the technical solution of the present disclosure includes two terminals: a client 1 and a server 2. The client 1 may specifically be the above-mentioned smart device, and may also be an application installed in the above-mentioned smart device (the application may execute corresponding steps of the method when being executed). A plurality of clients 1 are provided generally. The server 2 is a device capable of providing centralized service for the client 1 or an application installed in the device (the application can provide centralized services for the client 1 when being executed), and one server 2 is provided generally. The data synchronization are performed between the clients 1 through the server 2.

Figure 2:
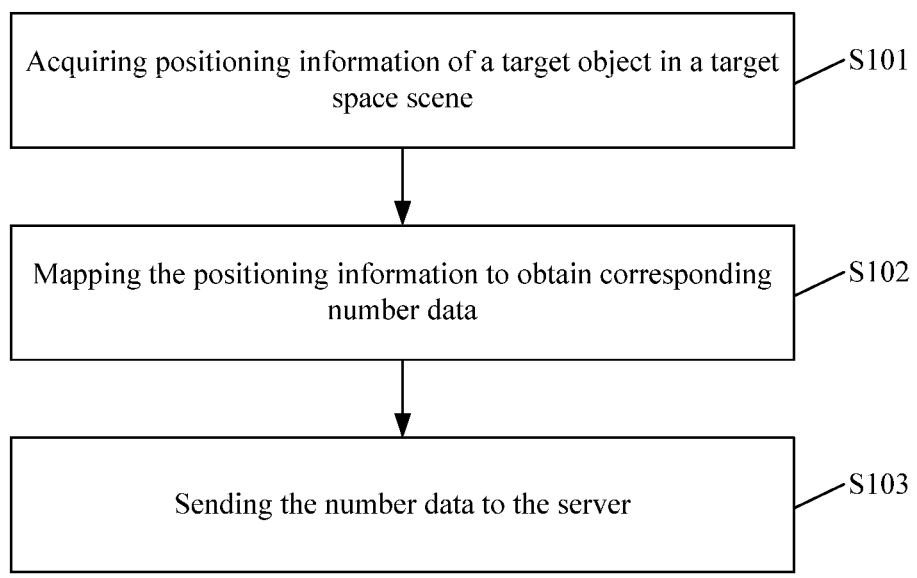
FIG. 2 is a flowchart showing a data synchronization method according to an embodiment of the present disclosure.

FIG. 2 is a flowchart showing a data synchronization method according to an embodiment of the present disclosure. As shown in FIG. 2, a data synchronization method according to the embodiment of the present disclosure is applied to a client and is used for sending out synchronization data, and the data synchronization method includes steps S101 to S103.

At step S101, acquiring positioning information of a target object in a target space scene.

The target object is an object in a target space scene to which a client executing the data synchronization method according to the embodiment is mapped.

Generally, a sensor or an input device is arranged on the client, the sensor or the input device generates corresponding control information, for controlling the target object in a target space scene, in response to an operation of a user; and meanwhile the client may also obtain the positioning information of the target object in the target space scene.

At step S102, mapping (i.e., performing a mapping process on) the positioning information to obtain corresponding number data, wherein a data amount of the number data is less than a data amount of the positioning information.

In step S102, the client may map the positioning information based on a preset first mapping algorithm to obtain the corresponding number data. The technical solution of the present disclosure does not limit the first mapping algorithm in step S102.

At step S103, sending the number data to the server, so that the server sends the number data to other client.

In step S103, the client sends the number data obtained at step S102 to the server, and the server sends the obtained number data (e.g., sends the obtained number data in a broadcast manner) to other client, so that the other client may obtain corresponding positioning information by mapping the number data based on a preset second mapping algorithm. The technical scheme of the present disclosure does not limit the second mapping algorithm used in the process of mapping the number data by other clients.

Compared with the technical scheme of directly transmitting the positioning information in the related technology, the technical scheme of the embodiment of the present disclosure maps the positioning information into the number data with a relatively small data amount, and then sends the number data to the server for other client to perform data synchronization based on the number data, so that the data amount can be effectively decreased, and the bandwidth can be saved.

In some embodiments, the target space scene may include a virtual game scene; specifically, a plurality of clients may be mapped to a plurality of corresponding virtual objects in the same virtual game scene. The positioning information of the virtual objects in the virtual game scene corresponding to the plurality of clients are required to be synchronized, so as to ensure accurate synchronization of the game.

In some embodiments, the target space scene may include a virtual interactive scene; specifically, a plurality of remote clients may be mapped to a plurality of corresponding virtual objects in the same virtual interaction scene, and interaction between the plurality of virtual objects in the virtual interaction scene may be realized. In the virtual game scene or the virtual interaction scene described above, the synchronization of the positioning information of the virtual objects is required to be realized rapidly and accurately at the client, so as to ensure the experience of the user. The technical scheme according to the embodiment of the present disclosure can effectively decrease the data amount in the synchronization process, so as to meet the requirement of rapid and accurate synchronization of the positioning information of the virtual objects. Of course, the technical solution of the present disclosure may also be applied to other scenarios, which will not be described here by way of examples.

In some embodiments, the positioning information includes position information and orientation information, the number data includes an area position number corresponding to the position information and an orientation area number corresponding to the orientation information. A data amount of the area position number is less than a data amount of the position information, and a data amount of the orientation area number is less than a data amount of the orientation information.

Optionally, the target space scene is an n-dimensional space, n is an integer greater than or equal to 2. The position information is n-dimensional data, and the area position number is 1-dimensional data. The orientation information is n-dimensional data, and the orientation area number is 1-dimensional data.

As an implementation, the target space scene is a 3-dimensional space, the position information is represented by 3-dimensional position coordinates, the orientation information is also represented by a 3-dimensional direction vector, and each of the position coordinates and the direction vector is 32-bit floating-point type data (i.e., float 32 data). That is to say, the data amount corresponding to one piece of positioning information is 6 float 32 data. The area position number obtained through the position information mapping processing is represented by one 1-dimensional 32-bit integer type data (i.e., int32 data), and the orientation area number obtained through the orientation information mapping processing is represented by one 1-dimensional 32-bit integer type data (i.e., int32 data). That is to say, the data amount corresponding to one piece of number data is 2 int32 data. That is to say, compared with the technical solution of directly transmitting the positioning information in the related art, the technical solution of the embodiment of the present disclosure may decrease the amount of synchronization data by about 66.7% by transmitting the number data obtained through the position information mapping processing.

It should be noted that, in the embodiment of the present disclosure, the positioning information may include only the position information, that is, the mapping processing is performed on the position information only, and at this time the number data includes only the area position number. In addition, the positioning information may include only the orientation information, that is, the orientation information is mapped only, and in this case the number data may include only the orientation area number. In addition, the positioning information may include both the position information and the orientation information, and only the position information is mapped and no orientation information is mapped, and in this case the area position number and the orientation information may be sent to the server. Alternatively, the positioning information may include both the position information and the orientation information, and only the orientation information is mapped and no position information is mapped, and in this case, the orientation area number and the position information may be transmitted to the server. The above situations can decrease the amount of data to be synchronized to some extent and save the bandwidth, which belong to the protection scope of the present disclosure too.

Figure 3:
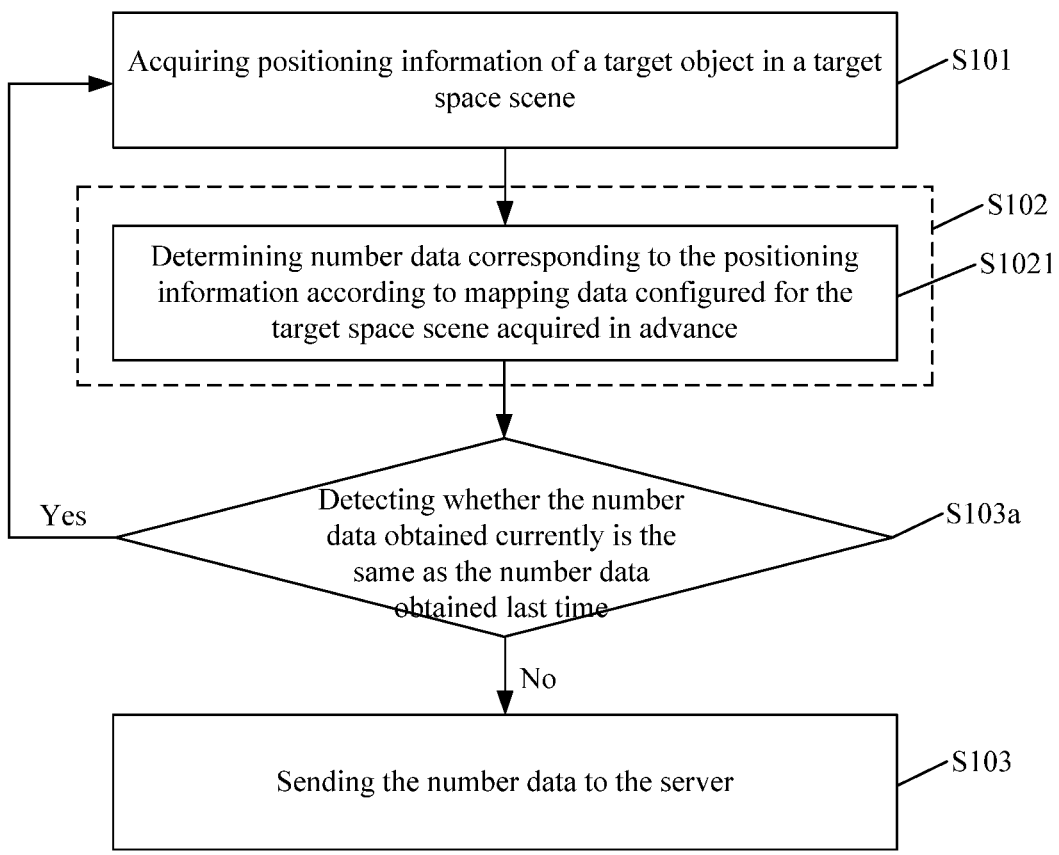
FIG. 3 is a flow chart showing a data synchronization method according to another embodiment of the present disclosure.

FIG. 3 is a flowchart showing a data synchronization method according to another embodiment of the present disclosure. As shown in FIG. 3, the data synchronization method shown in FIG. 3 is an implementation of the data synchronization method shown in FIG. 2, wherein step S102 specifically includes step S1021.

At step S1021, determining number data corresponding to the positioning information according to mapping data configured for the target space scene acquired in advance, wherein a mapping relation between pieces of positioning information and pieces of number data are recorded in the mapping data.

Specifically, a mapping relationship between the pieces of position information and the area position numbers and/or a mapping relationship between pieces of orientation information and the orientation area numbers are recorded in the mapping data.

With continued reference to FIG. 3, in some embodiments, the method further include step S103*a* between step S102 and step S103.

At step S103*a*, detecting whether the number data obtained currently is the same as the number data obtained last time (i.e., the number data obtained immediately before the current number data).

In step S103*a*, if the current number data obtained at step S102 is the same as the number data obtained immediately before the current number data, step S101 is executed. If the current number data obtained at step S102 is not the same as the number data obtained immediately before the current number data, step S103 is executed.

In some embodiments, the method includes the step of acquiring the positioning information of the target object in the target space scene after a preset time interval elapses if it is detected that the currently obtained number data is the same as the number data obtained last time.

In some embodiments, the data synchronization method further includes: determining whether the preset time interval reaches a preset maximum time interval or not, in response to detecting that the current number data obtained is the same as the number data obtained immediately before the current number data for i consecutive times, wherein i is an integer more than or equal to 1; maintaining the preset time interval unchanged if it is determined that the preset time interval reaches the preset maximum time interval; and increasing the preset time interval if it is determined that the preset time interval does not reach the preset maximum time interval.

In some embodiments, the method further includes: setting the preset time interval as a preset default time interval if it is detected that the currently obtained number data is the same as the number data obtained last time; and executing the step of acquiring the positioning information of the target object in the target space scene, after sending the number data to the server is completed and the preset default time interval elapses.

In some embodiments, the positioning information includes the position information, and the target space scene includes a plurality of subspaces. The mapping data includes a position mapping table in which a mapping relationship between pieces of position information and area position numbers is recorded. The position mapping table records pieces of data in one-to-one correspondence to the subspaces, and each piece of data in the position mapping table includes an area position number of a corresponding subspace and first area description data for defining a range of an area defined by the corresponding subspace.

In some embodiments, the plurality of subspaces divided from the target space scene are the same in shape and equal in size; alternatively, the plurality of subspaces divided from the target space scene are not completely the same in shape and/or are not completely equal in size. For the relevant content of the subspaces divided from the target space scene, reference may be made to the description below.

Figure 4A:
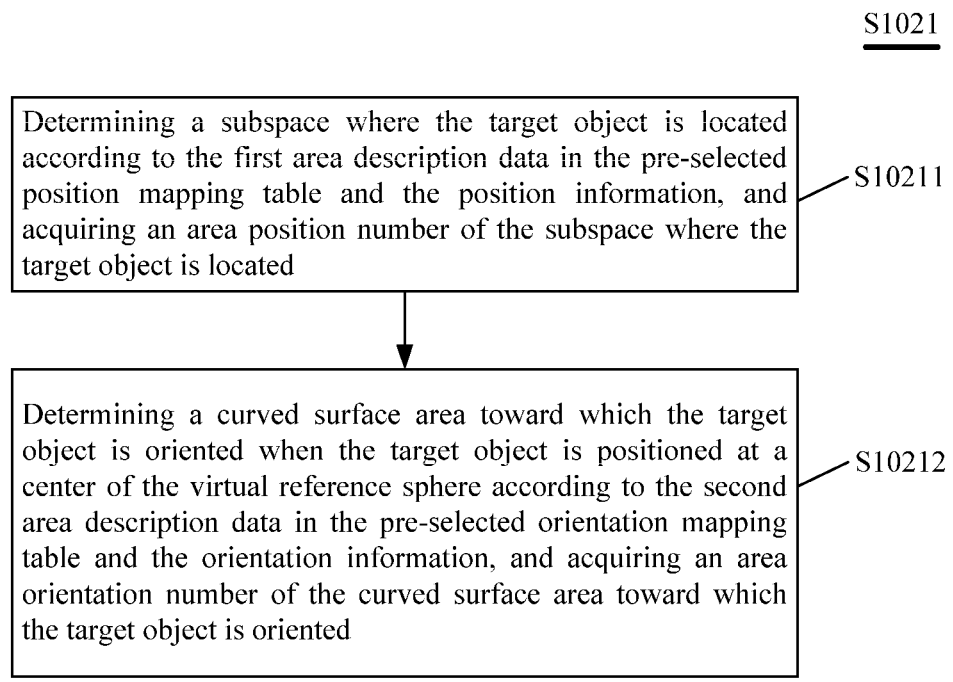
FIG. 4A is a flowchart showing an optional implementation of step S1021 according to an embodiment of the present disclosure.
Figure 4B:
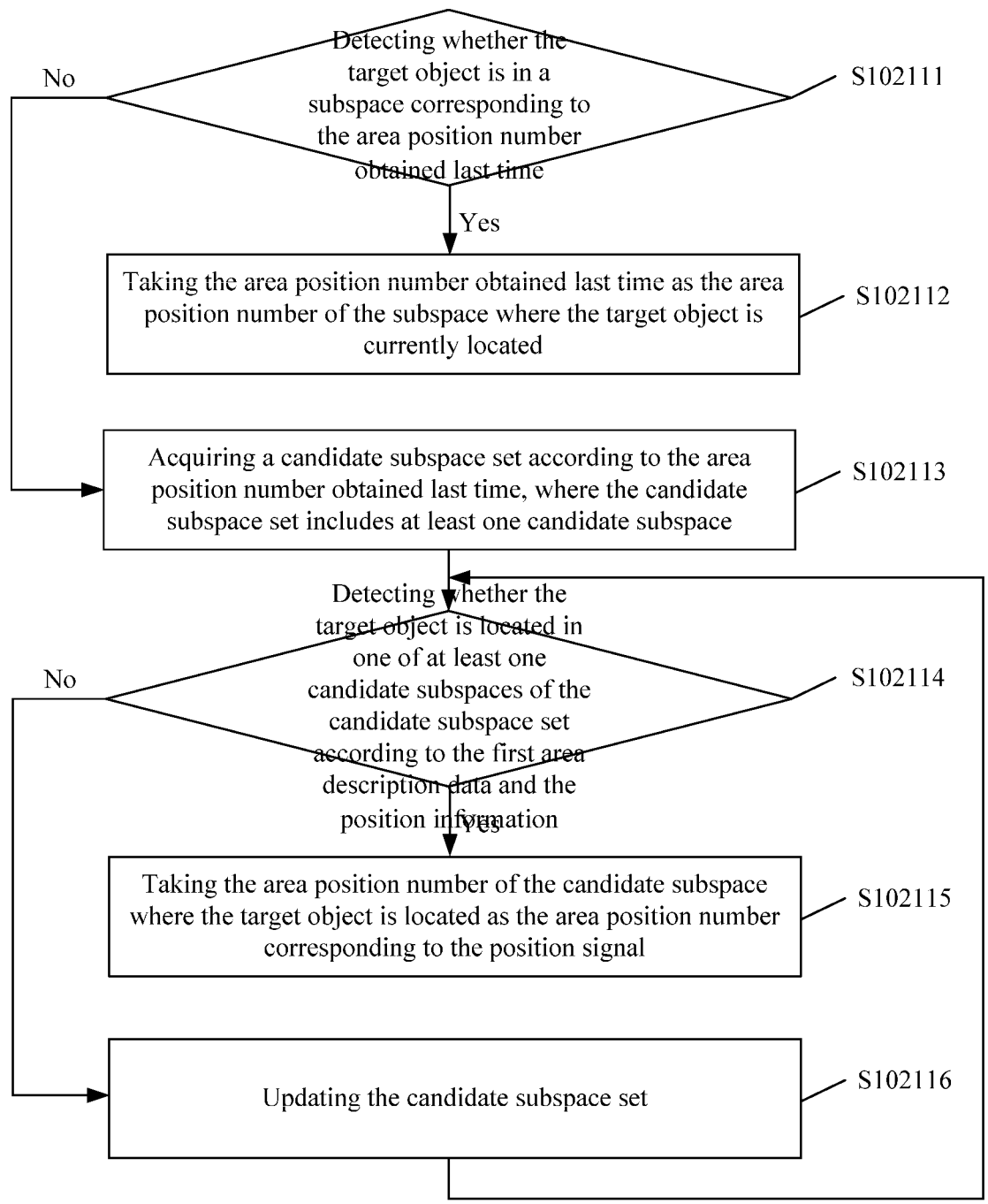
FIG. 4B is a flowchart showing an optional implementation of step S10211 according to an embodiment of the present disclosure.
Figure 4C:
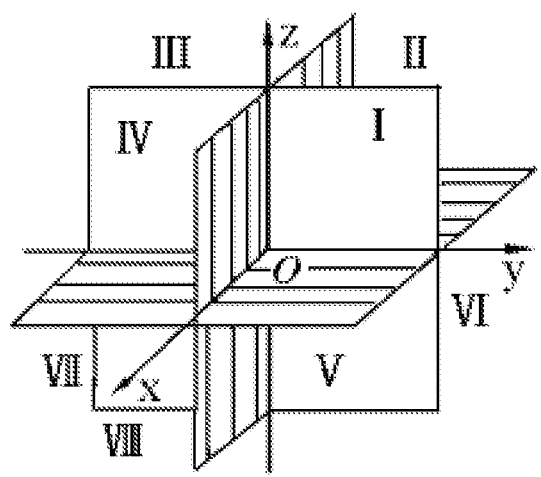
FIG. 4C is a schematic diagram showing a division of a three-dimensional space into eight quadrants in an embodiment of the present disclosure.
Figure 4D:
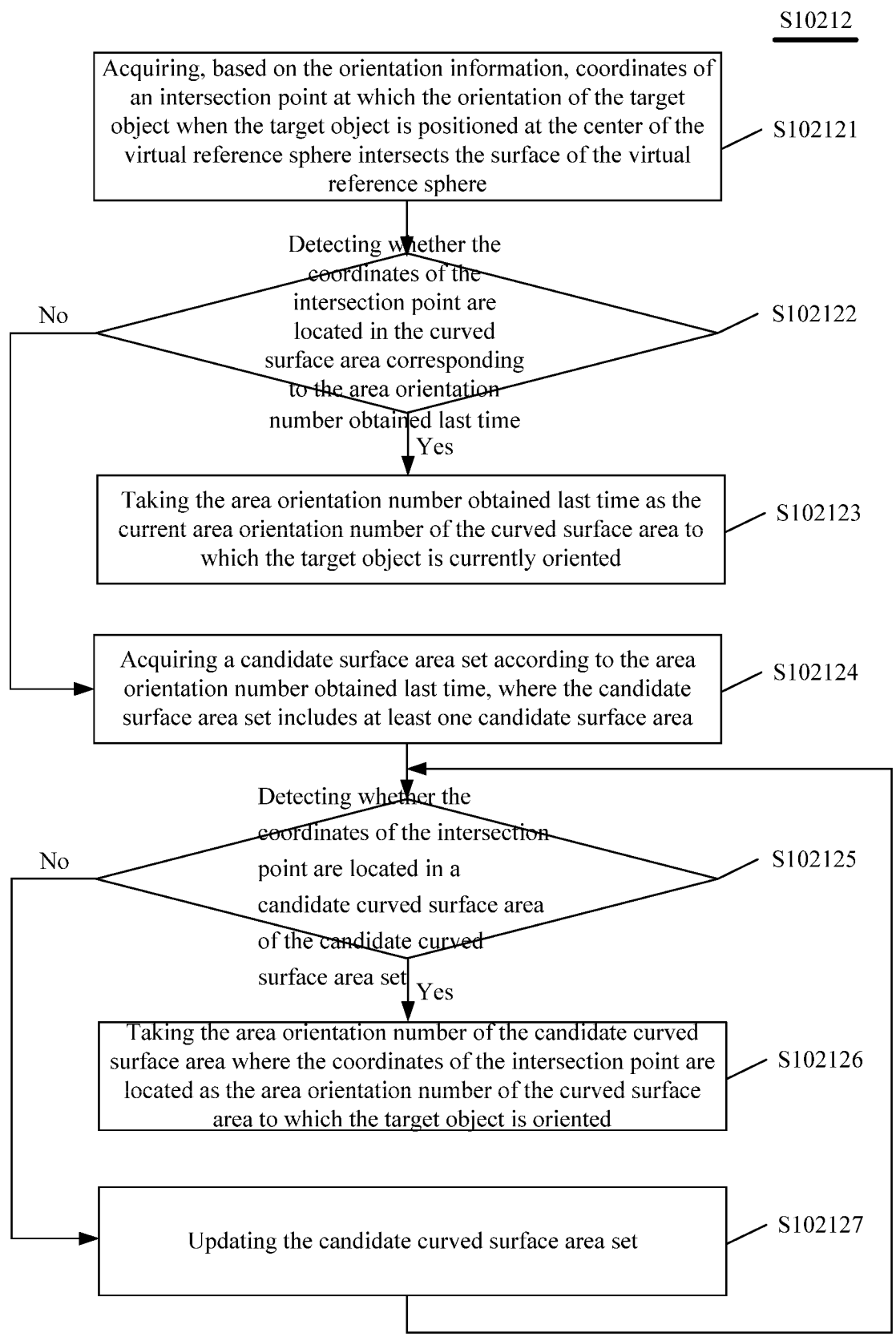
FIG. 4D is a flowchart showing an optional implementation of step S10212 according to an embodiment of the present disclosure.

FIG. 4A is a flowchart showing an optional implementation of step S1021 in an embodiment of the present disclosure, FIG. 4B is a flowchart showing an optional implementation of step S10211 in an embodiment of the present disclosure, FIG. 4C is a schematic diagram showing a division of a three-dimensional space into eight quadrants in an embodiment of the present disclosure, and FIG. 4D is a flowchart showing an optional implementation of step S10212 in an embodiment of the present disclosure. As shown in FIG. 4A to 4D, in some embodiments, step S1021 includes step S10211.

At step S10211, determining a subspace where the target object is located according to the first area description data in the pre-selected position mapping table and the position information, and acquiring an area position number of the subspace where the target object is located.

In some embodiments, the first area description data at least include representative position information configured for the subspace in advance. With the representative position information, the position information located in the same subspace may be unified and merged, so that mapping the position information to obtain the corresponding area position number and mapping the area position number to obtain the corresponding position information may be realized by the client based on the same position mapping table. Meanwhile, the frequency of data synchronization and jitter can be decreased. Specific examples of the first area description data will be described later.

In some embodiments, the target space scene is a 3-dimensional space, and the subspace thereof is a cubic subspace. The first area description data includes coordinates of a center point of the subspace and coordinates of one vertex of the subspace. At this time, the coordinates of a center point of the subspace may be determined as the representative position information for the subspace.

It should be noted that, the embodiment in which a range of an area defined by the subspace is described by using the coordinates of the central point of the subspace and the coordinates of one vertex of the subspace is taken as an exemplary only, which does not limit the technical solution of the present disclosure. In the embodiment of the present disclosure, the range of the area defined by the subspace may be described in other ways.

Figure 5:
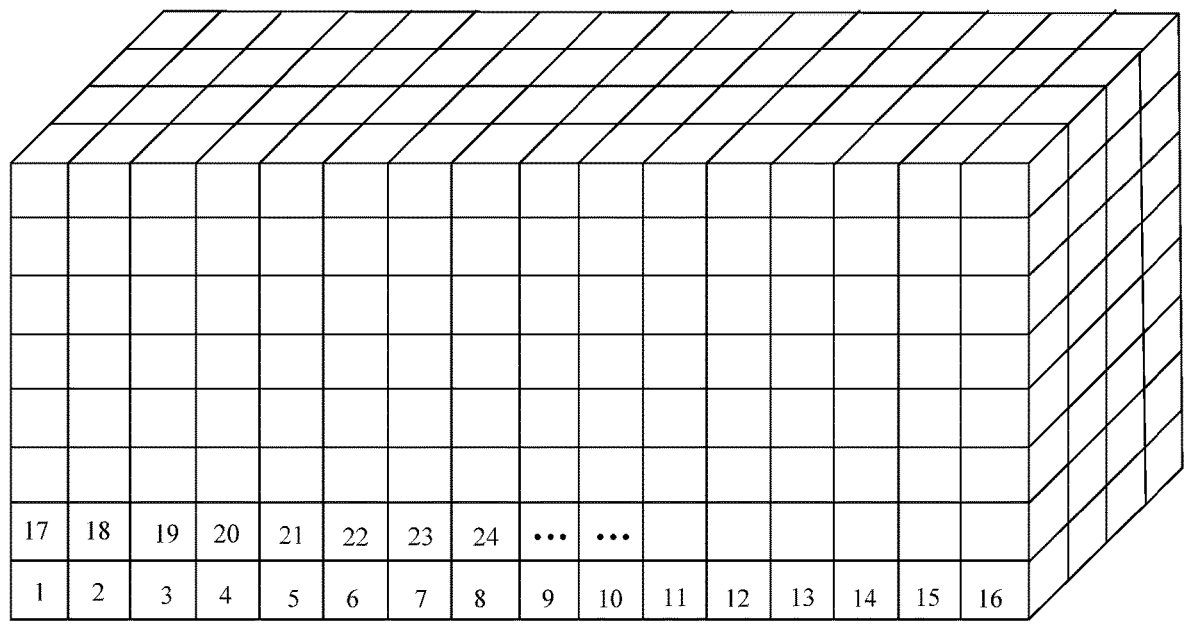
FIG. 5 is a schematic diagram showing a division of a target space scene into subspaces according to an embodiment of the present disclosure.

FIG. 5 is a schematic diagram showing a division of the target space scene into subspaces according to an embodiment of the present disclosure. As shown in FIG. 5, a front-end manual division method or an algorithm self-division method may be adopted to divide the target space scene into subspaces. FIG. 5 schematically shows that the target space scene is divided into a plurality of cubic subspaces the same in shape and equal in size (referred to as "uniform density division" in the present disclosure). Each of the cubic subspaces has a unique area position number (e.g., int32 number), and one piece of data for each of the cubic subspaces can be generated as: {area position number, first area description data}.

As an alternative, one piece of data for each of the cubic subspaces is: {area position number of the subspace, coordinates of a center point of the subspace, and coordinates of a vertex at the lower left corner of the subspace}; the data of all cubic subspaces form a position mapping table. As an example, in a case where a side length of each small cubic subspace in FIG. 5 is 1, the cubic subspace with the area position number of "1" has the coordinates of (0.5, 0.5, 0.5) of the central point and the coordinates of (0, 0, 0) of the vertex at the lower left corner; the cubic subspace with the area position number of "2" has the coordinates of (1.5, 0.5, 0.5) of the central point and the coordinates of (1, 0, 0) of the vertex at the lower left corner, and so on; and the generated position mapping table is: [{1, (0.5, 0.5, 0.5), (0, 0, 0)}, {2, (1.5, 0.5, 0.5), (1, 0, 0)}, {3, (2.5, 0.5, 0.5), (2, 0, 0)},].

For example, the position information of (0.1, 0, 0), (0.2, 0.3, 0.6) and (0, 0, 0.8) fall in a cubic subspace with an area position number of '1', the position information is unified and merged to the representative position information of the cubic subspace, that is, the coordinates (0.5, 0.5, 0.5) of the central point. When the position information needs to be synchronized, the area position number of '1' needs to be synchronized simply. In addition, the position jitter phenomenon happens when the position information of the target object changes in the same cubic subspace, the position information does not need to be synchronized since the area position numbers are 1 all the time, so that the frequency of data synchronization is decreased to a certain extent, and the jitter in position information can be avoided.

Figure 6:
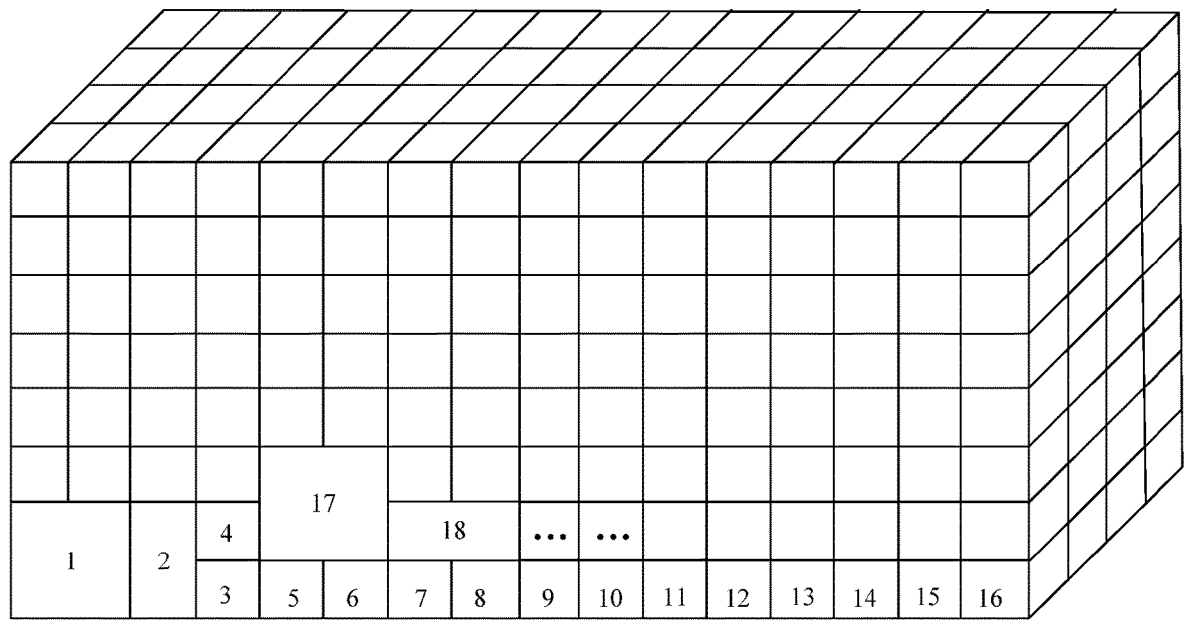
FIG. 6 is a schematic diagram showing a division of a target space scene into subspaces according to another embodiment of the present disclosure.

FIG. 6 is a schematic diagram showing a division of a target space scene into subspaces according to another embodiment of the present disclosure. As shown in FIG. 6, unlike the embodiment in which the cubic subspaces divided from the target space scene are the same in shape and equal in size, FIG. 6 schematically shows that a plurality of cubic subspaces divided from the target space scene are not completely the same in shape and/or are not completely equal in size (referred to as "non-uniform density division" in the present disclosure).

In the embodiment of the present disclosure, the target space scene is divided into subspaces according to the non-uniform density division method, so that the problem of sparse distribution of some areas in the space scene can be solved well. That is to say, a position mapping table may contain distribution of the subspaces based on different density, the requirement of differentiated distribution of areas based on different sparsity in the whole scene space can be realized, and the frequency of data synchronization and jitter can be reduced.

In the embodiment of the present disclosure, the present disclosure is not limited to a specific division scheme for dividing the target space scene into subspaces. In practical application, for the same space scene, different division schemes may be adopted to form the subspaces, and different position mapping tables may be obtained based on the different division schemes. When a plurality of position mapping tables are provided for the same space scene, one of the position mapping tables may be selected (e.g., pre-selected by the certain client or pre-selected by the server) according to actual needs, and the selected position mapping table may be currently applied to the target space scene.

Referring to FIG. 4B, in some embodiments, step S10211 specifically includes steps S10211 to S102116.

At step S102111, detecting whether the target object is in a subspace corresponding to the area position number obtained last time, according to the area position number obtained last time, the first area description data and the position information.

If yes, step S102112 is executed; if no, step S102113 is executed.

At step S102112, the area position number obtained last time serves as the area position number of the subspace where the target object is currently located.

At step S102113, acquiring a candidate subspace set according to the area position number obtained last time, where the candidate subspace set includes at least one candidate subspace.

At step S102114, detecting whether the target object is located in one of at least one candidate subspaces of the candidate subspace set according to the first area description data and the position information.

If yes, step S102115 is executed; if no, step S102116 is executed.

At step S102115, the area position number of the candidate subspace where the target object is located serves as the area position number corresponding to the position information.

At step S102116, updating the candidate subspace set.

After step S102116 is completed, the above step (i.e., step S102114) of detecting whether the target object is located in one of at least one candidate subspace of the candidate subspace set according to the first area description data and the position information is performed subsequently.

As an example, in order to determine whether the target object with position information of (x, y, z) is located in the subspace with the area position number k, first of all a piece of data corresponding to the area position number k may be searched over the position mapping table: {k, (Xc, Yc, Zc), (Xl, Yl, Zl)}, where (Xc, Yc, Zc) denotes the coordinates of the center point of the subspace with the area position number k, and (Xl, Yl, Zl) denotes coordinates of the vertex in the lower left corner of the subspace with the area position number k. Coordinates of a vertex in an upper right corner, which is symmetrical to the lower left corner about the central point, is obtained through calculation and is marked as (Xr, Yr, Zr). If x, y and z simultaneously satisfy: Xl≤x≤Xr, Yl≤y≤Yr, and Zl≤z≤Zr, which means that the target object with the position information of (x, y, z) is located in the subspace with the area position number k; if no, which means that the target object with the position information of (x, y, z) is not located in the subspace with the area position number k.

Determining the area position number corresponding to position information (x, y, z) includes the following steps: first of all, acquiring the immediately previous/last area position number and marking the acquired area position number as j; determining whether the target object is located in the area with the area position number j, according to the currently obtained position information (reference may be made to the foregoing content for the specific determination method); if yes, which means that the representative position is not changed and the area position number of the subspace where the target object is located currently is the area position number obtained last time; if no, determining whether the current position falls into one of the candidate subspaces of the candidate subspace set. It should be noted that, in the embodiment of the present disclosure, the candidate subspaces of the candidate subspace set may be selected according to a certain algorithm. For example, first of all, a subspace adjacent to the subspace with the area position number obtained last time is selected as a candidate subspace to obtain an initial candidate subspace set; and then comparing the coordinates (Xc, Yc, Zc) of the central point of the subspace with the area position number obtained last time with the current position information (x, y, z) to further narrow a scope of the candidate spaces. For example, referring to FIG. 4C, by taking the central point of the subspace with the area position numbers obtained last time as an original point, the three-dimensional space is divided into eight quadrants, as shown in FIG. 4C. If the current position information (x, y, z) satisfies x>Xc, y>Yc, and z>Zc, which indicates that the point corresponding to the current position information falls in the $I^{th}$ quadrant, so that the scope of the candidate subspace set is decreased. If it is determined that the current position of the target object is not located in one of the candidate subspaces of the candidate subspace set, the candidate subspace set is updated. Other subspaces which are adjacent to the candidate subspace of the current candidate subspace set and are far away from the subspace with the area position number j is selected as new candidate subspaces to generate a new candidate subspace set. That is, according to an order of an adjacent space connected to the subspace with the area position number j obtained last time, a secondary adjacent space connected to the adjacent space, and an adjacent space connected to the secondary adjacent space, the candidate subspace set is recursively diffused outward and updated until the area position number corresponding to the position information (x, y, z) is determined.

It should be noted that the above technical means for determining the area position number corresponding to the position information through steps S102111 to S102116 is only an optional embodiment of the present disclosure, and does not limit the technical solution of the present disclosure.

In some embodiments, the target space scene is a 3-dimensional space, and the positioning information includes orientation information which is a 3-dimensional direction vector corresponding to the orientation. The mapping data includes an orientation mapping table in which a mapping relation between different orientation information and orientation area numbers is recorded. The orientation mapping table is generated based on a preset virtual reference sphere, and a spherical surface of the virtual reference sphere includes a plurality of curved surface areas. Pieces of data in one-to-one correspondence with the curved surface areas are recorded in the orientation mapping table, and each piece of data in the orientation mapping table includes an area orientation number of a corresponding curved surface area and second area description data for defining a range of an area defined by the corresponding curved surface area.

With continued reference to FIG. 4A, in some embodiments, step S1021 includes step S10212.

At step S10212, determining a curved surface area toward which the target object is oriented when the target object is positioned at a center of the virtual reference sphere according to the second area description data in the pre-selected orientation mapping table and the orientation information, and acquiring an area orientation number of the curved surface area toward which the target object is oriented.

In some embodiments, the second area description data at least includes representative orientation information configured for the curved surface area in advance. With the representative orientation information, the orientation information located in the same curved surface area may be unified and merged, so that mapping the orientation information to obtain the corresponding orientation area number and mapping the orientation area number to obtain the corresponding orientation information may be realized by the client based on the same orientation mapping table. Meanwhile, the frequency of data synchronization and jitter can be decreased. Specific examples will be described below.

In some embodiments, the plurality of curved surface areas divided from the spherical surface of the virtual reference sphere are identical in shape and equal in size. alternatively, the plurality of curved surface areas divided from the spherical surface of the virtual reference sphere are not completely identical in shape and/or are not completely equal in size.

Figure 7:
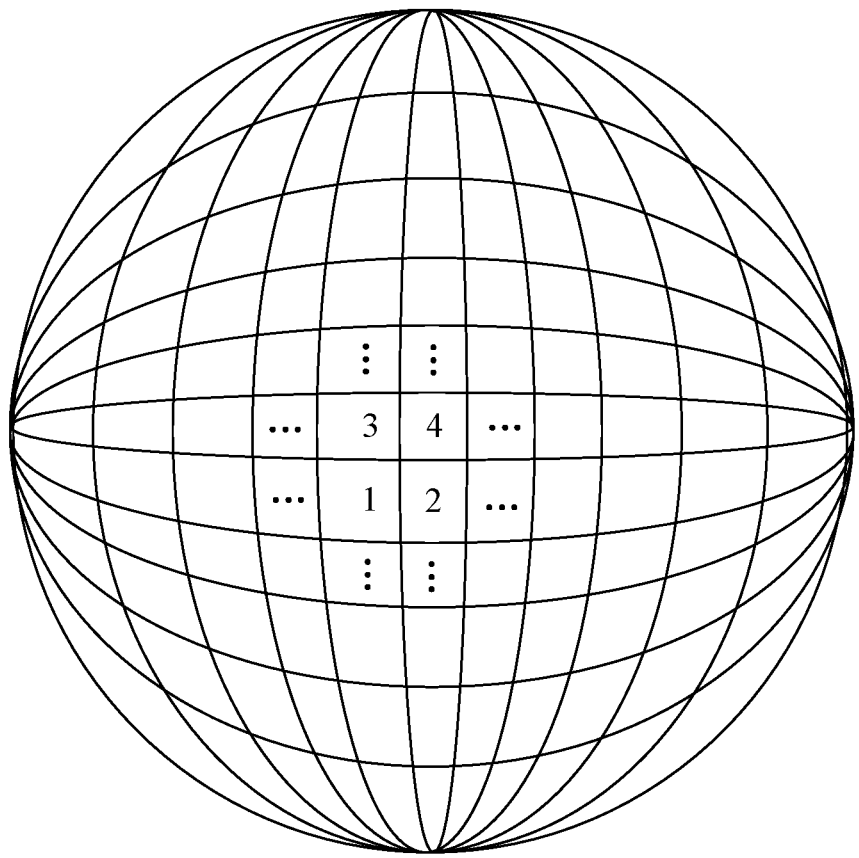
FIG. 7 is a schematic diagram of a division of a virtual reference sphere into a plurality of curved surface areas according to an embodiment of the present disclosure.

FIG. 7 is a schematic diagram showing a division of a spherical surface of a virtual reference sphere into a plurality of curved surface areas according to an embodiment of the present disclosure. As shown in FIG. 7, the spherical surface of the virtual reference sphere may be divided to a plurality of curved surface area through a front-end manual division method or an algorithm self-division method. In some embodiments, the spherical surface of the virtual reference sphere is divided into a plurality of curved surface areas by two great-circle sets, and each great circle of each great circle sets has a center which is the center of the virtual reference sphere and a radius which is a radius of the virtual reference sphere. Each of the two great-circle sets includes s great circles, and all the great circles in the same great-circle set have the same diameter, and two diameters of the two great-circle sets are perpendicular to each other. In the same great-circle set, the included angle between the planes where two adjacent great circles are located is 360°/s. In this case, the curved surface area divided for the target space scene includes a plurality of curved surface areas having three sides and a plurality of curved surface areas having four sides.

In some embodiments, the second area description data includes coordinates of a center point of a corresponding curved surface area, coordinates of a vertex of the corresponding curved surface area, and a direction vector from a center point of the virtual reference sphere to the center point of the corresponding curved surface area. In some embodiments, the direction vector from the center of the virtual reference sphere to the center point of the corresponding curved surface area is representative orientation information configured for the curved surface area.

It should be noted that, when the coordinates of the center of the virtual reference sphere is (0, 0, 0), the coordinates of the center point of the curved surface area and the direction vector from the center of the virtual reference sphere to the center point of the curved surface area may be represented by the same three-dimensional coordinate, that is, the direction vector from the center of the virtual reference sphere to the center point of the curved surface area may be represented by the coordinates of the center point of the curved surface area. In this case, the parameter "direction vector from the center of the virtual reference sphere to the center point of the curved surface area" may not be provided in the second area description data.

After the division of the spherical surface of the virtual reference sphere into curved surface areas is completed, each of the curved surface areas has a unique orientation area number (e.g., int32 number), and then a piece of data may be generated for each of the curved surface areas as follows: {orientation area number, second area description data}.

In an optional embodiment, one piece of data corresponding to each curved surface area is: {the orientation area number of the curved surface area, the coordinates of the central point of the curved surface area, the coordinates of the vertex in the lower left corner of the curved surface area, and the direction vector from the spherical center to the coordinates of the central point of the curved surface area}, and the data of all the curved surface areas form an orientation mapping table. If intersection points at which rays intersect the spherical surface are located in the same curved surface area, the orientation information corresponding to the rays are unified and merged into the representative orientation information of the curved surface area, that is, the coordinates of the central point of the curved surface area. When the orientation information needs to be synchronized, the orientation area number is synchronized simply. In addition, the orientation jitter phenomenon happens when the intersection points at which rays intersect the spherical surface changes in the same curved surface area. Since the intersection points correspond to the same orientation area number, the orientation information does not need to be synchronized, so that the frequency of data synchronization can be decreased to a certain extent, and jitter in orientation information can be avoided.

It should be noted that the method for dividing the spherical surface of the virtual reference sphere by using two concentric-circle sets is shown in FIG. 7 only for exemplary purposes, and does not limit the technical solution of the present disclosure. Other schemes such as a triangle network spherical division algorithm, a quadrangle network spherical division algorithm or a longitude and latitude grid spherical division algorithm may also be adopted for the division of the spherical surface of the virtual reference sphere into the curved surface areas. The specific division schemes will not be described in detail herein by way of examples.

Referring to FIG. 4D, in some embodiments, step S10212 includes step S102121 to S102127.

At step S102121, acquiring, based on the orientation information, coordinates of an intersection point at which the orientation of the target object when the target object is positioned at the center of the virtual reference sphere intersects the surface of the virtual reference sphere.

At step S102122, detecting whether the coordinates of the intersection point are located in the curved surface area corresponding to the area orientation number obtained last time, according to the area orientation number obtained last time, the second area description data, and the coordinates of the intersection point.

If yes, step S102123 is executed; if no, step S102124 is executed.

At step S102123, the area orientation number obtained immediately before the current area orientation number/obtained last time serves as the current area orientation number of the curved surface area to which the target object is currently oriented.

At step S102124, acquiring a candidate surface area set according to the area orientation number obtained last time, where the candidate surface area set includes at least one candidate surface area.

At step S102125, detecting whether the coordinates of the intersection point are located in a candidate curved surface area of the candidate curved surface area set according to the second area description data and the coordinates of the intersection point.

If yes, step S102126 is executed; if no, step S102127 is executed.

At step S102126, the area orientation number of the candidate curved surface area where the coordinates of the intersection point are located serves as the area orientation number of the curved surface area to which the target object is oriented.

At step S102127, updating the candidate curved surface area set.

After step S102127 is completed, the step (i.e., step S102125) of detecting whether the coordinates of the intersection point are located in a candidate curved surface area of the candidate curved surface area set based on the second area description data and the coordinates of the intersection point is performed subsequently.

The specific processes of step S102122 to step S102127 are similar to the processes of step S102111 to step S102116, and will not be described herein again.

It should be noted that FIG. 4A only shows an embodiment in which step S1021 includes both step S10211 and step S10212, and step S10211 is before step S10212. In some embodiments, step S10211 may be follow step S10212 or synchronous with step S10212. In other embodiments, step S1021 may include only step S10211 or only step S10212; these embodiments also fall within the scope of the present disclosure.

Figure 8:
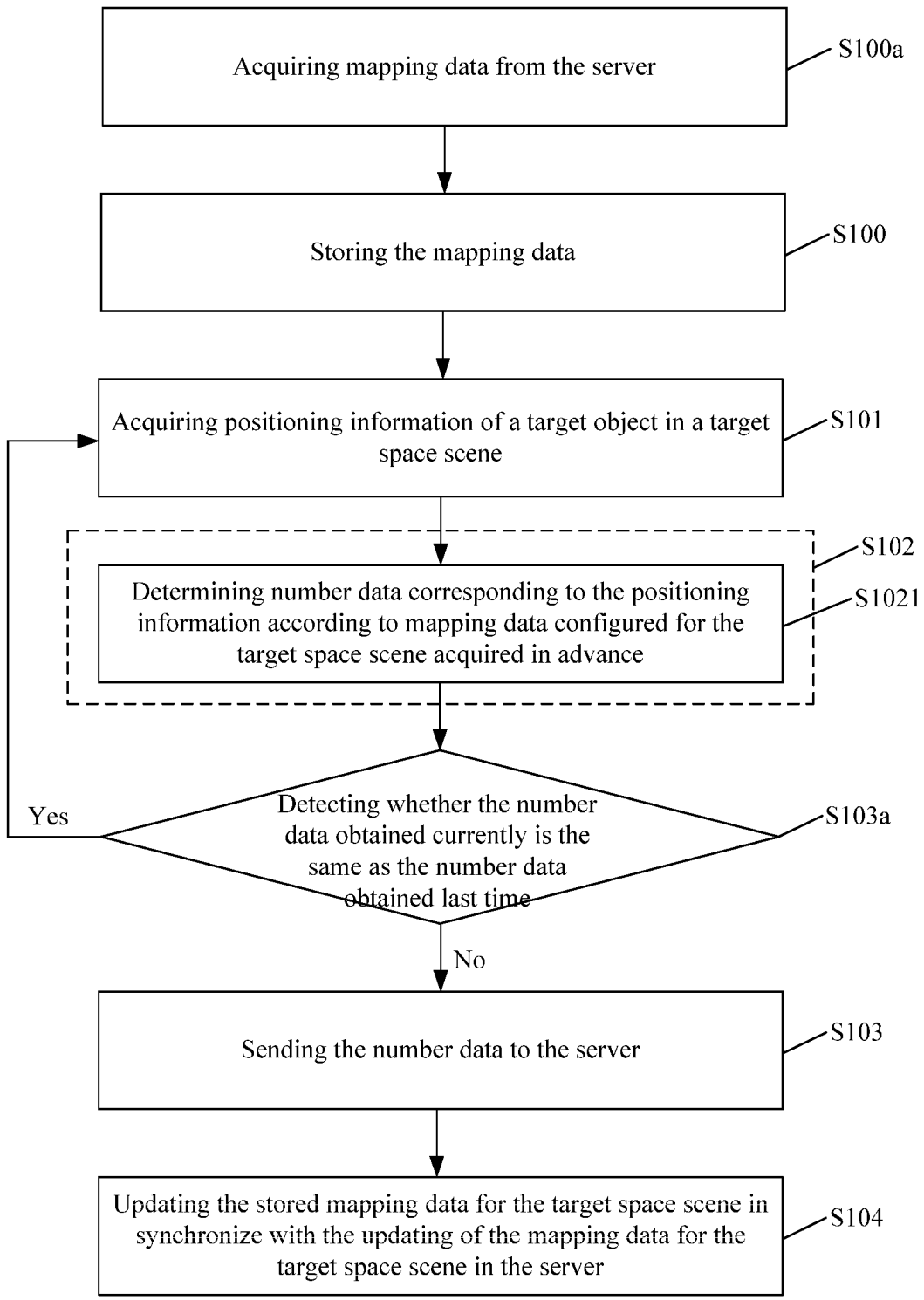
FIG. 8 is a flowchart showing a data synchronization method according to another embodiment of the present disclosure.

FIG. 8 is a flowchart of a data synchronization method according to another embodiment of the present disclosure. As shown in FIG. 8, the data synchronization method includes not only step S101, step S102, step S103a and step S103, but also step S100a and step S100 before step S102 (FIG. 8 exemplarily shows an embodiment in which step S100a and step S100 are executed before step S101), and step S104 after step S100 (FIG. 8 exemplarily shows an embodiment in which step S104 is executed after step S103). Only step S100a, step S100, and step S104 will be described in detail below.

At step S100a, acquiring mapping data from the server.

The client may send a download request to the server through a discovery (or discover) mechanism to download the corresponding mapping data.

At step S100, storing the mapping data.

The client may locally store the downloaded mapping data.

In some embodiments, the client may save the downloaded mapping data in a database on a storage disk, and meanwhile cache a copy of data in an internal storage, which is beneficial to improving the data throughput capability of the client.

At step S104, in response to the updating of the mapping data for the target space scene in the server, synchronously updating the stored mapping data for the target space scene.

The client may monitor the mapping data in the server in real time through a monitoring (or supervisory control) mechanism. When the mapping data in the server is updated, the client may synchronously update the mapping data stored locally in a hard disk and a cache.

In the embodiment of the present disclosure, through the discovery mechanism and the monitoring mechanism, the timely acquisition and online update of the mapping data by the client can be realized.

Figure 9:
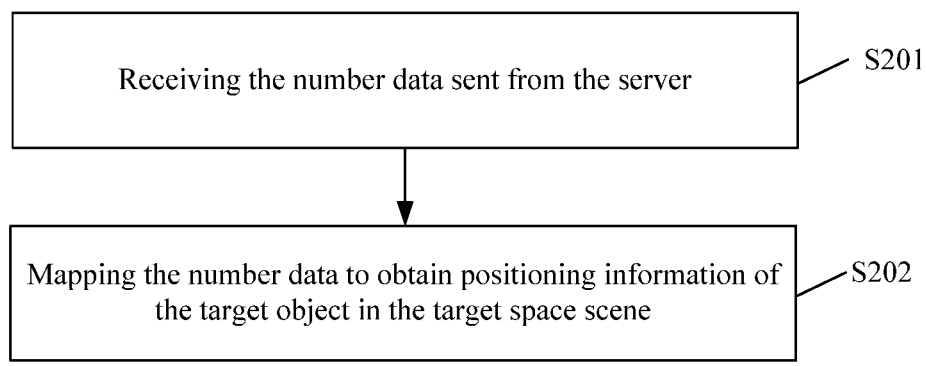
FIG. 9 is a flowchart showing a data synchronization method according to yet another embodiment of the present disclosure.

Based on the same inventive concept, an embodiment of the present disclosure further provides a data synchronization method, which is applied to a client (i.e., "other client" in the foregoing embodiments) and is configured to receive the synchronization data. FIG. 9 is a flowchart showing a data synchronization method according to yet another embodiment of the present disclosure. As shown in FIG. 9, the data synchronization method includes steps S201 to S202.

At step S201, receiving the number data sent from the server.

At step S202, mapping the number data to obtain positioning information of the target object in the target space scene, and the data amount of the number data is less than that of the position information.

Compared with the technical scheme of directly receiving the positioning information in the related technology, the technical scheme of the embodiments of the present disclosure maps the positioning information into the number data with relatively small data amount in advance, sends the number data to the server, and then the client acquires the number data from the server to synchronize the data. The technical solution in the embodiments of the present disclosure can effectively reduce the amount of synchronized data and save the bandwidth.

In some embodiments, the number data includes an area position number and/or an orientation area number. The positioning information includes position information corresponding to the area position number and/or orientation information corresponding to the orientation area number. The data amount of the area position number is less than the data amount of the position information, and the data amount of the orientation area number is less than the data amount of the orientation information.

Optionally, the target space scene is an n-dimensional space, n is an integer greater than or equal to 2. The position information is n-dimensional data, and the area position number is 1-dimensional data. The orientation information is n-dimensional data, and the orientation area number is 1-dimensional data.

As a specific example, the target space scene is a 3-dimensional space, the position information is represented by 3-dimensional position coordinates. The orientation information is also represented by a 3-dimensional direction vector. Each of the position coordinates and the direction vector is 32-bit floating-point type data (i.e., float 32 data). That is, the data amount corresponding to one piece of positioning information is six float32 data. The area position number obtained after the position information mapping process is represented by one 1-dimensional 32-bit integer type data (i.e., int32 data), and the orientation area number obtained after the orientation information mapping process is represented by one 1-dimensional 32-bit integer type data (i.e., int32 data), that is, the data amount corresponding to one piece of number data is two int32 data. That is to say, compared with the technical solution of directly receiving the positioning information in the related art, the technical solution of the embodiments of the present disclosure may decrease the amount of synchronization data by about 66.7% by receiving the number data obtained by mapping the positioning information.

Figure 10:
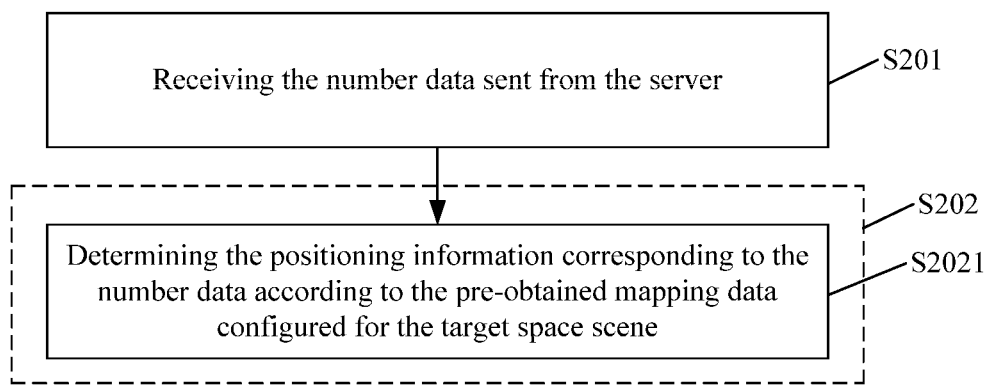
FIG. 10 is a flowchart showing a data synchronization method according to still another embodiment of the present disclosure.

FIG. 10 is a flowchart showing a data synchronization method according to yet another embodiment of the present disclosure. As shown in FIG. 10, the data synchronization method shown in FIG. 10 is an implementation of the data synchronization method shown in FIG. 9, where the step S202 specifically includes a step S2021.

At step S2021, determining the positioning information corresponding to the number data according to the pre-obtained mapping data configured for the target space scene, where the mapping data includes a mapping relationship between pieces of positioning information and pieces of number data.

In some embodiments, the positioning information includes position information, and the target space scene is divided into a plurality of subspaces. The mapping data includes a position mapping table in which a plurality pieces of data in one-to-one correspondence with the plurality of subspaces are recorded. Each piece of data in the position mapping table includes an area position number of a corresponding subspace and first area description data for defining a range of an area defined by the corresponding subspace, and the first area description data at least includes representative position information configured for the corresponding subspace in advance.

Figure 11:
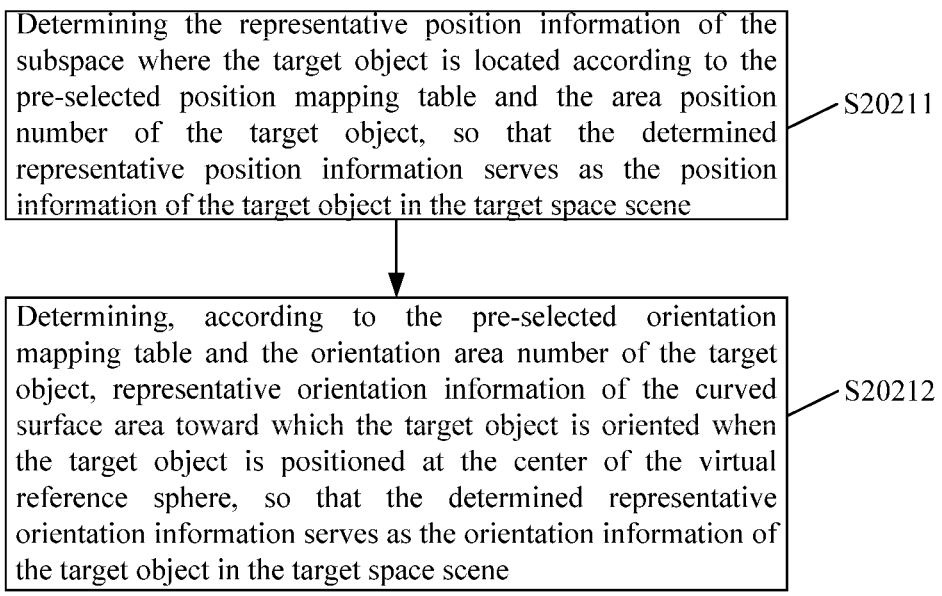
FIG. 11 is a flowchart showing an optional implementation of step S2021 according to an embodiment of the present disclosure.

FIG. 11 is a flowchart showing an optional implementation of step S2021 in an embodiment of the present disclosure. As shown in FIG. 11, in some embodiments, step S2021 includes step S20211.

At step S20211, determining the representative position information of the subspace where the target object is located, according to the pre-selected position mapping table and the area position number of the target object, so that the determined representative position information serves as the position information of the target object in the target space scene.

In some embodiments, the target space scene is a 3-dimensional space, each of the subspaces is a cubic subspace. The first area description data includes coordinates of a central point of a corresponding subspace and coordinates of one vertex of the corresponding subspace. The coordinates of the central point of the subspace serves as the representative position information for the corresponding subspace.

It should be noted that, for the description of the position mapping table and description of determining the representative position information of the subspace where the target object is located according to the position mapping table and the area position number in the embodiments of the present disclosure, reference may be made to relevant contents in the foregoing embodiment, and details thereof will not be described herein again.

In some embodiments, the target space scene is a 3-dimensional space, the positioning information includes orientation information which is a 3-dimensional direction vector corresponding to the orientation. The mapping data includes an orientation mapping table which is generated based on a preset virtual reference sphere, and the spherical surface of the virtual reference sphere includes a plurality of curved surface areas. A plurality pieces of data in one-to-one correspondence with the plurality of curved surface areas are recorded in the orientation mapping table, each piece of data in the orientation mapping table includes an area orientation number of a corresponding curved surface area and second area description data for defining a range of an area defined by the corresponding curved surface area. The second area description data at least includes representative orientation information for the corresponding curved surface area in advance.

Continuing to refer to FIG. 11, in some embodiments, step S2021 includes step S20212.

At step S20212, determining, according to the pre-selected orientation mapping table and the orientation area number of the target object, representative orientation information of the curved surface area toward which the target object is oriented when the target object is positioned at the center of the virtual reference sphere, so that the determined representative orientation information serves as the orientation information of the target object in the target space scene.

In some embodiments, the curved surface area is a three-sided curved surface or a four-sided curved surface. The second area description data includes the coordinates of the central point of a corresponding curved surface area, the coordinates of one vertex of the corresponding curved surface area, and a direction vector from the spherical center of the virtual reference sphere to the central point of the corresponding curved surface area, wherein the direction vector from the spherical center of the virtual reference sphere to the central point of the corresponding curved surface area serves as the representative orientation information for the corresponding curved surface area.

It should be noted that, for the description of the orientation mapping table and description of determining the representative orientation information of the curved surface area to which the target object is oriented according to the orientation mapping table and the orientation area number in the embodiment of the present disclosure, reference may be made to relevant contents in the foregoing embodiments, and details will not be repeated herein again.

It should be noted that, in practical applications, one client may have functions of sending and receiving synchronous data at the same time. That is, the same client may perform the data synchronization method shown in FIGS. 2, 3, and 8 to send out the synchronized data, and may also perform the data synchronization method shown in FIGS. 9 and 10 to receive the synchronized data.

Figure 12:
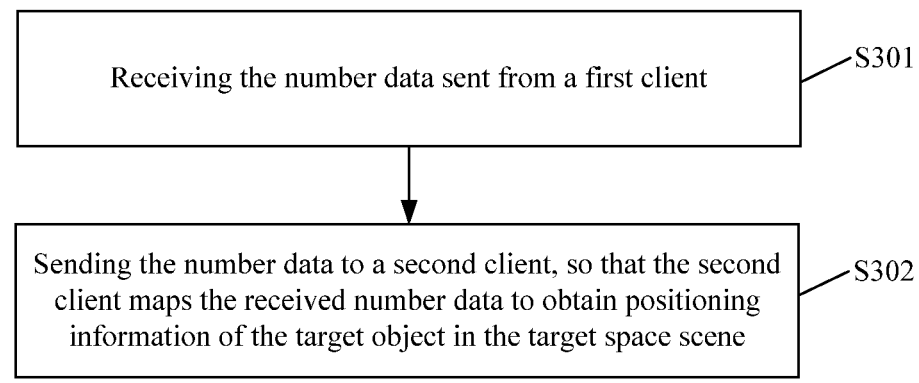
FIG. 12 is a flowchart showing a data synchronization method according to yet another embodiment of the present disclosure.

Based on the same inventive concept, the embodiment of the present disclosure further provides a data synchronization method which is applied to a server. FIG. 12 is a flowchart showing a data synchronization method according to still another embodiment of the present disclosure. As shown in FIG. 12, the data synchronization method includes steps S301 and S302.

At step S301, receiving the number data sent from a first client.

At step S302, sending the number data to a second client, so that the second client maps the received number data to obtain positioning information of the target object in the target space scene.

The first client may be a client that executes the methods shown in FIG. 2, FIG. 3, and FIG. 8 in the foregoing embodiment, and the second client may be a client that executes the data synchronization methods shown in FIG. 9 and FIG. 10 in the foregoing embodiment.

Figure 13:
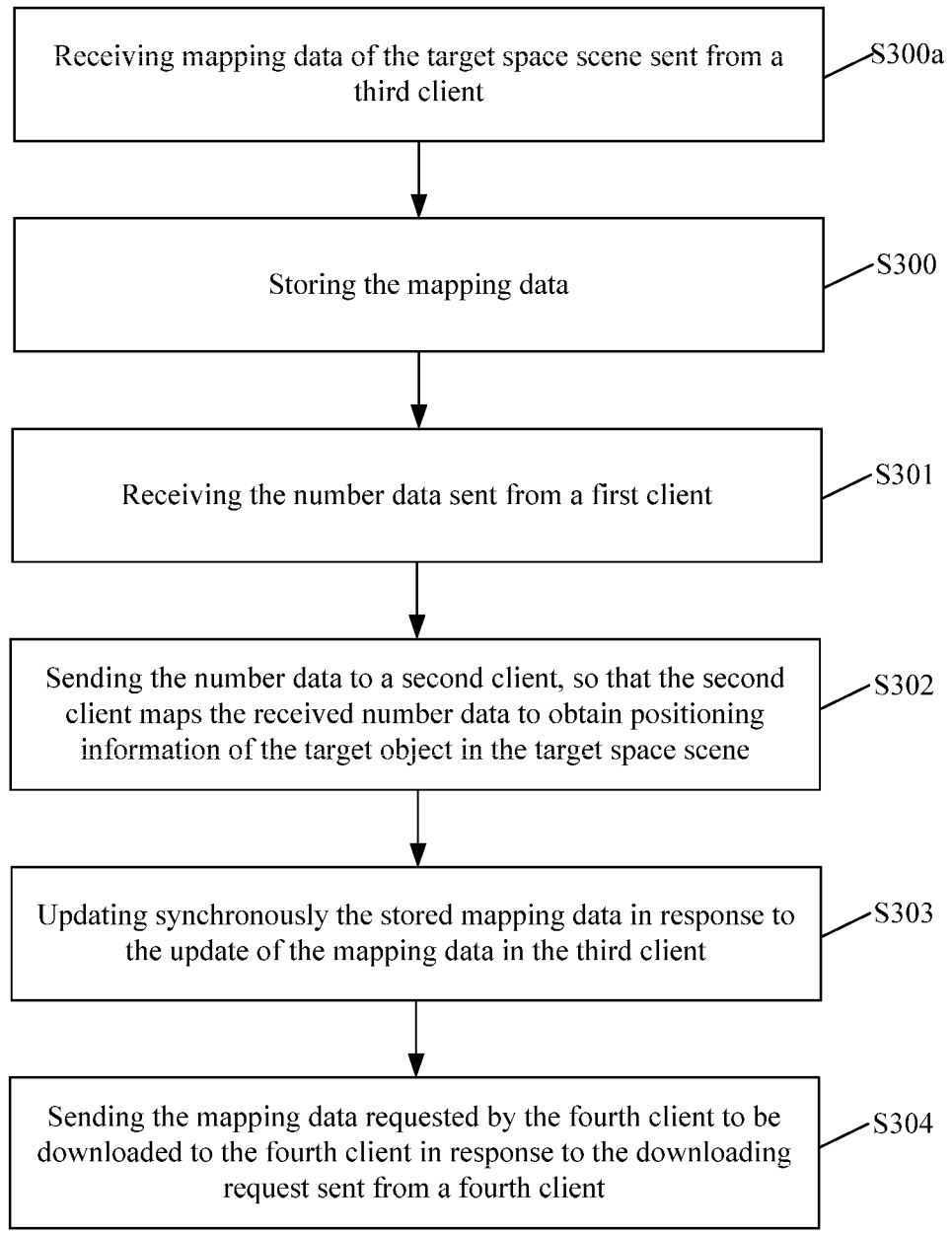
FIG. 13 is a flowchart showing a data synchronization method according to yet another embodiment of the present disclosure.

FIG. 13 is a flowchart showing a data synchronization method according to yet another embodiment of the present disclosure. As shown in FIG. 13, the data synchronization method not only includes the above steps S301 and S302, but also includes step S300a and step S300 before step S301, and step S303 and step S304 after step S300 (FIG. 13 exemplarily shows an embodiment in which step S303 and step S304 are executed after step S302).

At step S300a, receiving mapping data of the target space scene sent from a third client, where the mapping data includes a mapping relationship between different positioning information and number data.

The third client is different from the first client and the second client, and the third client may send the mapping data of the target space scene to the server through a registration mechanism, so that the server may store the mapping data of the target space scene. The mapping data stored at the server may be downloaded by the clients (e.g., the first client and the second client).

At step S300, storing the mapping data.

In some embodiments, the server may save mapping data sent from the third client in the database on a storage disk, and meanwhile, cache a copy of data in the internal storage, which is beneficial to improving the data throughput capability of the server side.

At step S303, updating synchronously the stored mapping data in response to the update of the mapping data in the third client.

At step S304, sending the mapping data requested to be downloaded by the fourth client to the fourth client in response to the downloading request sent from a fourth client.

The fourth client may be any one of the clients, for example, the fourth client may be the first client or the second client described above.

Based on the same inventive concept, an embodiment of the present disclosure further provides an electronic device which is the client in the any one of the embodiments described above. The electronic device includes one or more first processors and a first storage device. The first storage device has one or more programs stored thereon that, when executed by the one or more first processors, cause the one or more first processors to implement the steps in the data synchronization method according to any one of the embodiments shown in FIGS. 2, 3, 8, 9, and 10.

Based on the same inventive concept, an embodiment of the present disclosure further provides an electronic device which is the server in any one of the embodiments described above. The electronic device includes one or more second processors and a second storage device. The second storage device has one or more programs stored thereon, which when executed by the one or more second processors, cause the one or more second processors to implement the steps in the data synchronization method according to any one of the embodiments shown in FIG. 12 or FIG. 13.

It should be noted that, the first processor and the second processor are devices with data processing capability, which include but are not limited to a Central Processing Unit (CPU), etc. The first and second storage devices are devices having data storage capabilities, which include but not limited to, Random Access Memory (RAM, more specifically SDRAM, DDR, etc.), Read Only Memory (ROM), Electrically Erasable Programmable Read Only Memory (EEPROM), FLASH. The first/second processor and the first/second storage device may be connected through an I/O interface to realize information interaction between the first/second processor and the first/second storage device, and the I/O interface includes but is not limited to, a data Bus (Bus) and the like.

The present disclosure has disclosed example embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the present disclosure as set forth in the appended claims.

What is claimed is:

1. A data synchronization method for a first client, comprising:
acquiring positioning information of a target object in a target space scene;
mapping the positioning information to obtain number data corresponding to the positioning information, wherein a data amount of the number data is less than a data amount of the positioning information; and
sending the number data to a server, so that the server sends the number data to a second client,
wherein mapping the positioning information to obtain the number data comprises: determining the number data corresponding to the positioning information, according to mapping data configured for the target space scene acquired in advance, wherein a mapping relation between the positioning information and the number data is recorded in the mapping data,
the target space scene is a 3-dimensional space, the positioning information comprises an orientation information which is a 3-dimensional direction vector corresponding to an orientation, and the mapping data comprises an orientation mapping table generated based on a preset virtual reference sphere and a spherical surface of the virtual reference sphere comprises a plurality of curved surface areas, and
a plurality pieces of data in one-to-one correspondence with the plurality of curved surface areas are recorded in the orientation mapping table, and each piece of data in the orientation mapping table comprises an area orientation number of the curved surface area and second area description data for defining a range of an area defined by the curved surface area.

2. The data synchronization method of claim 1, wherein the positioning information comprises position information and/or the orientation information, and
the number data comprises an area position number corresponding to the position information and/or an orientation area number corresponding to the orientation information, a data amount of the area position number being less than a data amount of the position information, and a data amount of the orientation area number being less than a data amount of the orientation information.

3. The data synchronization method of claim 2, wherein the target space scene is an n-dimensional space, n is an integer greater than or equal to 2,
the position information is n-dimensional data, and the area position number is 1-dimensional data, and
the orientation information is n-dimensional data, and the orientation area number is 1-dimensional data.

4. The data synchronization method of claim 1, wherein the positioning information comprises the position information, and the target space scene comprises a plurality of subspaces;
  the mapping data comprises a position mapping table in which a plurality of pieces of data in one-to-one correspondence with the plurality of subspaces are recorded, and each piece of data in the position mapping table comprises an area position number of a subspace and first area description data used for defining a range of an area defined by the subspace.

5. The data synchronization method of claim 4, wherein the plurality of subspaces of the target space scene are the same in shape and equal in size;
  or the plurality of subspaces of the target space scene are not completely the same in shape and/or are not completely equal in size.

6. The data synchronization method of claim 4, wherein the target space scene is a 3-dimensional space, each of the plurality of subspaces is a cubic subspace, and
  the first area description data comprises coordinates of a center point of a subspace and coordinates of one vertex of the subspace.

7. The data synchronization method of claim 4, wherein determining the number data corresponding to the positioning information according to the mapping data configured for the target space scene acquired in advance, comprises:
  determining the subspace where the target object is located according to the first area description data in the pre-selected position mapping table and the position information to obtain the area position number of the subspace where the target object is located.

8. The data synchronization method of claim 7, wherein determining the subspace where the target object is located according to the first area description data in the pre-selected position mapping table and the position information to obtain the area position number of the subspace where the target object is located, comprises:
  detecting whether the target object is located in the subspace corresponding to the area position number obtained last time or not, according to the area position number obtained last time, the first area description data, and the position information;
  taking the area position number obtained last time as the area position number of the subspace where the target object is currently located, in response to that the target object is located in the subspace corresponding to the area position number obtained last time,
  acquiring a candidate subspace set according to the area position number obtained last time, in response to that the target object is not located in the subspace corresponding to the area position number obtained last time, wherein the candidate subspace set comprises at least one candidate subspace;
  detecting whether the target object is located in one of the at least one candidate subspace of the candidate subspace set according to the first area description data and the position information;
  taking the area position number of the candidate subspace where the target object is located as the area position number corresponding to the position information, in response to that the target object is located in one of the at least one candidate subspace of the candidate subspace set;
  updating the candidate subspace set, in response to that the target object is not located in one of the at least one candidate subspace of the candidate subspace set, and continuing to detect whether the target object is located in one of the at least one candidate subspace of the candidate subspace set according to the first area description data and the position information.

9. The data synchronization method of claim 1, wherein the plurality of curved surface areas of the spherical surface of the virtual reference sphere are the same in shape and equal in size;
  or the plurality of curved surface areas of the spherical surface of the virtual reference sphere are not completely the same in shape and/or are not completely equal in size.

10. The data synchronization method of claim 1, wherein each of the plurality of curved surface area is a curved surface having three sides or a curved surface having four sides, and
  the second area description data comprises coordinates of a center point of the curved surface area, coordinates of one vertex of the curved surface area, and a direction vector from a spherical center of the virtual reference sphere to the center point of the curved surface area.

11. The data synchronization method of claim 1, wherein determining the number data corresponding to the positioning information according to the mapping data configured for the target space scene acquired in advance, comprises:
  determining a curved surface area towards which the target object is oriented when the target object is positioned at the spherical center of the virtual reference sphere according to the second area description data in the pre-selected direction mapping table and the orientation information to obtain the area direction number of the curved surface area towards which the target object is oriented.

12. The data synchronization method of claim 11, wherein determining the curved surface area towards which the target object is oriented when the target object is at the center of the virtual reference sphere, according to the second area description data in the pre-selected orientation mapping table and the orientation information to obtain the area orientation number of the curved surface area towards which the target object is oriented, comprises:
  acquiring, according to the orientation information, coordinates of an intersection point where the orientation of the target object intersects the spherical surface of the virtual reference sphere when the target object is positioned at the sphere center of the virtual reference sphere;
  detecting whether the coordinates of the intersection point are located in the curved surface area corresponding to the area orientation number obtained last time, according to the area orientation number obtained last time, the second area description data, and the coordinates of the intersection point;
  taking the area orientation number obtained last time as the area orientation number of the curved surface area to which the target object is currently oriented, in response to that the coordinates of the intersection point are located in the curved surface area corresponding to the area orientation number obtained last time;
  acquiring a candidate curved surface area set according to the area orientation number obtained last time, in response to that the coordinates of the intersection point are not located in a curved surface area corresponding to the area orientation number obtained last time, wherein the candidate curved surface area set comprises at least one candidate curved surface area;

detecting whether the coordinates of the intersection point are located in one of the at least one candidate curved surface area of the candidate curved surface area set, according to the second area description data and the coordinates of the intersection point;

taking the area orientation number of the candidate curved surface area where the coordinates of the intersection point are located as the area orientation number of the curved surface area to which the target object is oriented, in response to that the coordinates of the intersection point are located in one of the at least one candidate curved surface area of the candidate curved surface area set;

updating the candidate curved surface area set, in response to that the coordinates of the intersection point are not located in one of the at least one candidate curved surface area of the candidate curved surface area set; and continuing to detect whether the coordinates of the intersection point are located in one of the at least one candidate curved surface area of the candidate curved surface area set according to the second area description data and the coordinates of the intersection point.

13. The data synchronization method of claim 1, wherein before the determining the number data corresponding to the positioning information according to the mapping data acquired in advance, the method further comprises:
acquiring the mapping data from the server; and
storing the mapping data,
wherein storing the mapping data comprises:
saving the mapping data on a storage disk, and
caching the mapping data in an internal storage,
the target space scene comprises a virtual game scene or a virtual interactive scene.

14. The data synchronization method of claim 13, wherein after storing the mapping data, the method further comprises:
updating the stored mapping data for the target space scene in synchronize with the updating of the mapping data for the target space scene in the server.

15. The data synchronization method of claim 1, wherein between mapping the positioning information to obtain the number data and sending the number data to the server, the method further comprises:
detecting whether the number data obtained currently is the same as the number data obtained last time;
acquiring the positioning information of the target object in the target space scene, in response to that the number data obtained currently is the same as the number data obtained last time; and
sending the number data to the server, in response to that the number data obtained currently is not the same as the number data obtained last time.

16. The data synchronization method of claim 15, wherein acquiring the positioning information of the target object in the target space scene after a preset time interval elapses in response to that the currently obtained number data is the same as the number data obtained last time;
the data synchronization method further comprises:
determining whether the preset time interval reaches a preset maximum time interval or not in response to that the currently obtained number data is the same as the number data obtained last time for i times, wherein i is an integer greater than or equal to 1, and
maintaining the preset time interval unchanged, in response to that the preset time interval reaches the preset maximum time interval;

increasing the preset time interval, in response to that the preset time interval does not reach the preset maximum time interval;
in response to that the number data obtained currently is the same as the number data obtained last time, the method further comprises: setting the preset time interval as a preset default time interval; and
acquiring the positioning information of the target object in the target space scene, after the number data is sent to the server and the preset default time interval elapses.

17. A data synchronization method for a client, comprising:
receiving number data sent from a server; and
mapping the number data to obtain positioning information of the target object in a target space scene, wherein a data amount of the number data is less than a data amount of the position information,
wherein mapping the number data to obtain the positioning information of the target object in the target space scene, comprises: determining the positioning information corresponding to the number data according to mapping data configured for the target space scene acquired in advance, wherein a mapping relation between the positioning information and the number data is recorded in the mapping data,
the target space scene is a 3-dimensional space, the positioning information comprises an orientation information which is a 3-dimensional direction vector corresponding to an orientation, and the mapping data comprises an orientation mapping table generated based on a preset virtual reference sphere and a spherical surface of the virtual reference sphere comprises a plurality of curved surface areas, and
a plurality pieces of data in one-to-one correspondence with the plurality of curved surface areas are recorded in the orientation mapping table, and each piece of data in the orientation mapping table comprises an area orientation number of the curved surface area and second area description data for defining a range of an area defined by the curved surface area, and the second area description data at least comprises representative orientation information configured for the curved surface area in advance.

18. A data synchronization method for a server, comprising:
receiving number data sent from a first client;
sending the number data to a second client, so that the second client maps the received number data to obtain the positioning information of the target object in the target space scene,
the data synchronization method further comprises: receiving and storing mapping data of the target space scene sent from a third client, wherein a mapping relation between the positioning information and the number data is recorded in the mapping data,
the target space scene is a 3-dimensional space, the positioning information comprises an orientation information which is a 3-dimensional direction vector corresponding to an orientation, and the mapping data comprises an orientation mapping table generated based on a preset virtual reference sphere and a spherical surface of the virtual reference sphere comprises a plurality of curved surface areas, and
a plurality pieces of data in one-to-one correspondence with the plurality of curved surface areas are recorded in the orientation mapping table, and each piece of data in the orientation mapping table comprises an area orientation number of the curved surface area and second area description data for defining a range of an area defined by the curved surface area.

* * * * *